US010325432B2

(12) United States Patent
Oh et al.

(10) Patent No.: US 10,325,432 B2
(45) Date of Patent: Jun. 18, 2019

(54) METHOD FOR SETTING UP MULTI REMOTE CONTROL IN VEHICLE AND VEHICLE THEREOF

(71) Applicants: Hyundai Motor Company, Seoul (KR); Kia Motors Corporation, Seoul (KR)

(72) Inventors: Se Min Oh, Incheon (KR); Seung Hai Hwang, Gyeonggi-do (KR); Jaejun Lee, Gyeonggi-do (KR); Jongdae Kim, Gyeonggi-do (KR); Jack Joseph, Telangana (IN); Nimmagadda Adithya, Telangana (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/631,228

(22) Filed: Jun. 23, 2017

(65) Prior Publication Data

US 2018/0182198 A1 Jun. 28, 2018

(30) Foreign Application Priority Data

Dec. 27, 2016 (KR) .................. 10-2016-0179643

(51) Int. Cl.
*G07C 9/00* (2006.01)
*B60R 16/023* (2006.01)

(52) U.S. Cl.
CPC ........ *G07C 9/00857* (2013.01); *B60R 16/023* (2013.01); *G07C 9/00119* (2013.01)

(58) Field of Classification Search
CPC ............ G07C 9/00857; G07C 9/00119; B60R 16/023

USPC .............................. 340/425.5, 426.1, 426.35
See application file for complete search history.

(56) References Cited

U.S. PATENT DOCUMENTS 7,486,927 B2 * 2/2009 Kallio ............... H04B 7/18563
370/316

FOREIGN PATENT DOCUMENTS

| JP | 2014-151892 A | 8/2014 |
|---|---|---|
| JP | 2015231057 A | 12/2015 |
| KR | 10-23012-0056050 | 6/2012 |
| KR | 10-2014-0043943 A | 4/2014 |
| KR | 10-2014-0128805 A | 11/2014 |
| KR | 10-201509137947 | 12/2015 |
| KR | 10-2016-0089752 A | 7/2016 |

(Continued)

OTHER PUBLICATIONS

Notice of Allowance for Korean Patent Application No. 10-2016-0179643, dated Apr. 17, 2019, 7 pages, English abstract.

*Primary Examiner* — Daryl C Pope
(74) *Attorney, Agent, or Firm* — Mintz Levin Cohn Ferris Glovsky and Popeo, P.C.; Peter F. Corless

(57) ABSTRACT

A vehicle includes: a communicator configured to perform wireless communication with a given mobile communication terminal disposed in the vehicle; a display configured to display information relating to multi-remote control for a plurality of mobile communication terminals disposed in the vehicle; and a controller configured to display a plurality of remote control functions through the display in response to a user request for the multi-remote control and to distribute the plurality of remote control functions to the plurality of mobile communication terminals disposed in the vehicle.

18 Claims, 11 Drawing Sheets

(56) References Cited

FOREIGN PATENT DOCUMENTS

KR 101657657 B1 9/2016

\* cited by examiner

METHOD FOR SETTING UP MULTI REMOTE CONTROL IN VEHICLE AND VEHICLE THEREOF

CROSS-REFERENCE TO RELATED APPLICATION

This application claims the benefit of priority to Korean Patent Application No. 10-2016-0179643, filed on Dec. 27, 2016, the disclosure of which is incorporated herein by reference in its entirety.

BACKGROUND

1. Technical Field

The present disclosure relates generally to vehicular technologies and, more particularly, to a method for setting up multi-remote control in a vehicle and the vehicle thereof.

2. Discussion of Related Art

Recently, various additional service devices for vehicles have been developed to enhance comfort and safety of the driver. These additional service devices vehicles may include, for example, safety aid devices, such as a lane departure warning system for preventing departure of the vehicle from a lane by assisting the driver in manipulating the steering wheel, a navigation system for guiding the driver along a route to a destination chosen by the driver and providing information about the route's surroundings, a service to play various media, e.g., music, movies, television, etc., through Bluetooth communication with a mobile communication terminal belonging to the driver, or a hands-free calling service to assist the driver in making calls without handling his/her cell phone.

Typically, several passengers inside the vehicle, apart from the driver, carry their own mobile communication terminals. Considering such a situation, various techniques have been sought to provide a more convenient driving environment, even for the fellow passengers.

SUMMARY OF THE INVENTION

Embodiments of the present disclosure provide a method for setting up multi-remote control in a vehicle and the vehicle thereof to distribute various remote control functions that may be supported through short-range radio communication to a plurality of mobile communication terminals in the vehicle.

In accordance with embodiments of the present disclosure, a vehicle includes: a communicator configured to perform wireless communication with a given mobile communication terminal disposed in the vehicle; a display configured to display information relating to multi-remote control for a plurality of mobile communication terminals disposed in the vehicle; and a controller configured to display a plurality of remote control functions through the display in response to a user request for the multi-remote control and to distribute the plurality of remote control functions to the plurality of mobile communication terminals disposed in the vehicle.

The controller may be configured to repeatedly perform the distribution of the plurality of remote control functions in response to the user request unless a number of the plurality of the mobile communication terminals exceeds a multi-remote control reference number.

When all of the plurality of remote control functions have been distributed to a single mobile communication terminal, the controller may be configured to release a remote control function newly requested by a user among the plurality of remote control functions and to distribute the released remote control function to a new mobile communication terminal.

When a number of the plurality of mobile communication terminals having an activated remote control function exceeds a multi-remote control reference number, the controller may be configured to release a remote control function newly requested by a user from a mobile communication terminal among the plurality of mobile communication terminals having the activated the remote control function and to distribute the released remote control function to a new mobile communication terminal.

The controller may be configured to change a multi-remote control mode to a single remote control mode in response to a user request and to release all of the plurality of remote control functions distributed to the plurality of mobile communication terminals.

When a remote control function is to be released from one of the plurality of mobile communication terminals, the controller may be configured to distribute the released remote control function to another mobile communication terminal of the plurality of mobile communication terminals.

The plurality of remote control functions may include a hands-free calling function and a function to remotely control devices in the vehicle.

The communicator and the given mobile communication terminal may be connected to each other through Bluetooth communication.

Furthermore, in accordance with embodiments of the present disclosure, a method for setting up multi-remote control in a vehicle includes: displaying a plurality of remote control functions through a display in response to a user request to activate multi-remote control from a user; receiving a selection of a remote control function among the plurality of remote control functions from the user; discovering a mobile communication terminal among a plurality of mobile communication terminals disposed in the vehicle, the plurality of mobile communication terminals able to perform wireless communication; and distributing the remote control function to the discovered mobile communication terminal.

The method may further include: after distributing the remote control function, repeatedly performing distribution of the plurality of remote control functions in response to the user request unless a number of the plurality of the mobile communication terminals exceeds a multi-remote control reference number.

The method may further include: after receiving the user request to activate the multi-remote control and before the displaying of the plurality of remote control functions, determining whether there is a mobile communication terminal among the plurality of mobile communication terminals having an activated remote control function; and when it is determined that there is a mobile communication terminal having an activated remote control function, determining whether a number of the plurality of mobile communication terminals having an activated remote control function exceeds a multi-remote control reference number.

The method may further include: when the number of the plurality of mobile communication terminals having the activated remote control function exceeds the multi-remote control reference number, releasing the remote control function selected by the user from the mobile communication terminal having the activated remote control function after receiving the selection of the remote control function and before the distribution of the remote control function to the discovered mobile communication terminal; and distributing the released remote control function to a newly discovered mobile communication terminal.

The method may further include: when a number of the plurality of mobile communication terminals having the activated remote control function does not exceed the multi-remote control reference number, determining whether the remote control function selected by the user overlaps a remote control function that has been previously activated after receiving the selection of the remote control function and before the distribution of the remote control function to the discovered mobile communication terminal; when it is determined that the remote control function selected by the user overlaps a remote control function that has been previously activated, releasing the overlapping remote control function from a corresponding mobile communication terminal; and distributing the released remote control function to a newly discovered mobile communication terminal.

The method may further include: when the number of the plurality of mobile communication terminals having the activated remote control function does not exceed the multi-remote control reference number, determining whether the remote control function selected by the user overlaps a remote control function that has been previously activated after receiving the selection of the remote control function and before the distribution of the remote control function to the discovered mobile communication terminal; and when it is determined that the remote control function selected by the user does not overlap a remote control function that has been previously activated, distributing the remote control function selected by the user to the discovered mobile communication terminal.

The method may further include: after the distribution of the remote control function to the discovered mobile communication terminal, changing a multi-remote control mode to a single remote control mode in response to a request to release a multi-remote control from the user; and releasing all of the plurality of remote control functions distributed to the plurality of mobile communication terminals.

The method may further include: after the distribution of the remote control function to the discovered mobile communication terminal, releasing a remote control function requested to be released from the corresponding mobile communication terminal when a request to release the remote control function from a mobile communication terminal of the plurality of mobile communication terminals is received from the user, and distributing the released remote control function to another mobile communication terminal.

The plurality of remote control functions may include a hands-free calling function and a function to remotely control devices in the vehicle.

The a communicator equipped in the vehicle and the mobile communication terminal may be connected to each other through Bluetooth communication.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which.

DETAILED DESCRIPTION OF EXEMPLARY EMBODIMENTS

Figure 1:
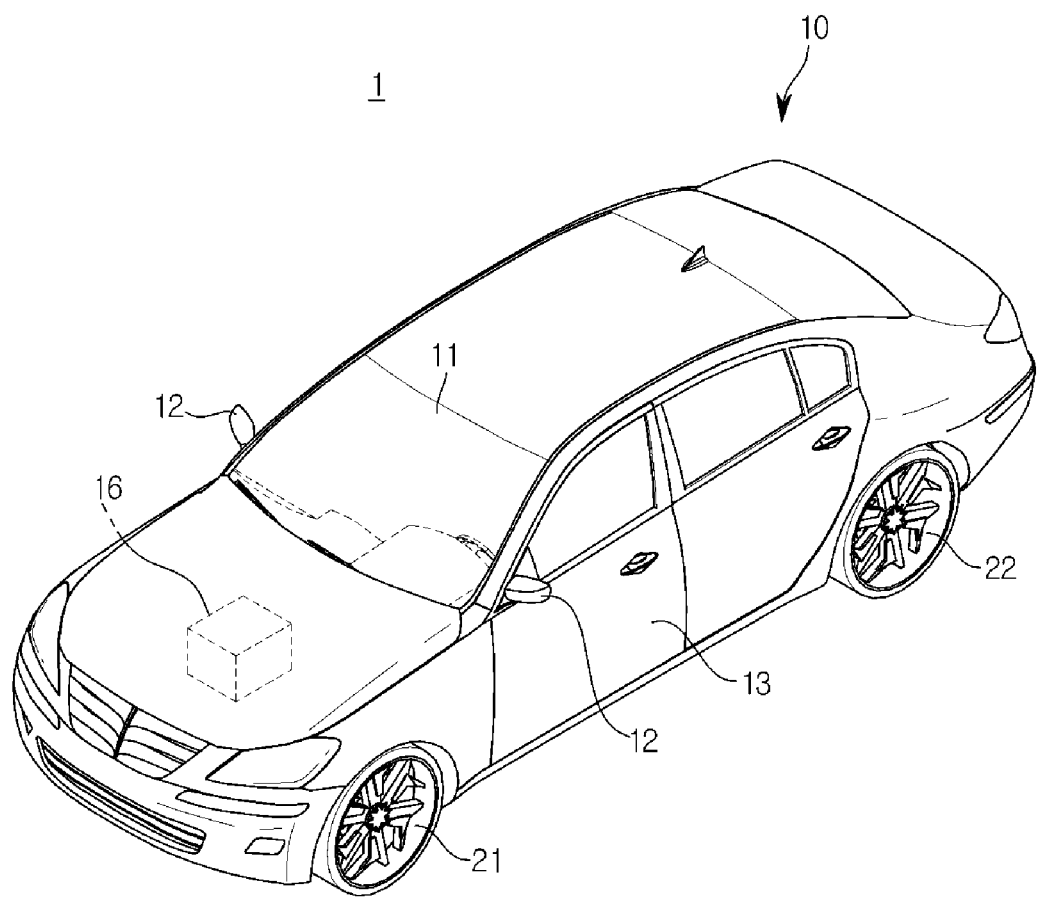
FIG. 1 shows the exterior of a vehicle.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are just used for convenience of explanation, but not to limit an order of the steps. Thus, unless the context clearly dictates otherwise, the written order may be practiced otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The principle and embodiments of the present disclosure will now be described with reference to accompanying drawings.

FIG. 1 shows an example exterior of a vehicle.

As shown in FIG. 1, the exterior of a vehicle 1 may include a main body 10 that constitutes the exterior of the vehicle 1, a windscreen 11 for providing views ahead of the vehicle 1 for the driver, side mirrors 12 for helping the driver see views behind the vehicle 1, doors 13 for shielding the interior of the vehicle 1 from outside, and wheels 21 and 22 for moving the vehicle 1 including front wheels 21 located in the front part of the vehicle 1, rear wheels 22 located in the rear part of the vehicle 1.

The windscreen 11 is mounted on the upper front of the main body 10 for allowing the driver to obtain views ahead of the vehicle 1. The side mirrors 12 include a left side mirror and a right side mirror placed on the left and right sides of the main body 10, respectively, for helping the driver obtain views behind and to the sides of the vehicle 1.

The doors 13 may be pivotally attached onto the left and right sides of the main body 10, and opened for the driver and passenger to get on or get off the vehicle 1 and closed for shielding the inside of the vehicle 1 from outside.

In addition to what are described above, the vehicle 1 may include a power system 16 for turning the wheels 21 and 22, a steering system (not shown) for changing moving direction of the vehicle 1, and a braking system (not shown) for stopping the movement of the wheels.

The power system 16 provides turning force to the front or rear wheels 21 or 22 to move the main body 10 forward or backward. The power system 16 may include a motor that produces the turning force from electrical power supplied from a charging battery (not shown) or a combustion engine (not shown) that burns a fuel to create the turning force.

The steering system may include a steering handle 42 (see FIG. 2) manipulated by the driver for controlling driving direction, a steering gear (not shown) for transforming the rotary motion of the steering handle 42 to the reciprocating motion, and a steering link (not shown) for transferring the reciprocating motion of the steering gear to the front wheels 21. The steering system may change the moving direction of the vehicle 1 by changing the direction of the wheel rotation axis.

The braking system may include a brake pedal (not shown) manipulated by the driver for braking operation, a brake drum (not shown) combined with the wheels 21, 22, and a brake shoe (not shown) for braking the rotation of the brake drum. The braking system may brake driving of the vehicle 1 by stopping the rotation of the wheels 21, 22.

It should be understood that the exterior of the vehicle 1 illustrated in FIG. 1 and described above is provided demonstration purposes only, and thus does not limit the scope of the present disclosure or claims.

Figure 2:
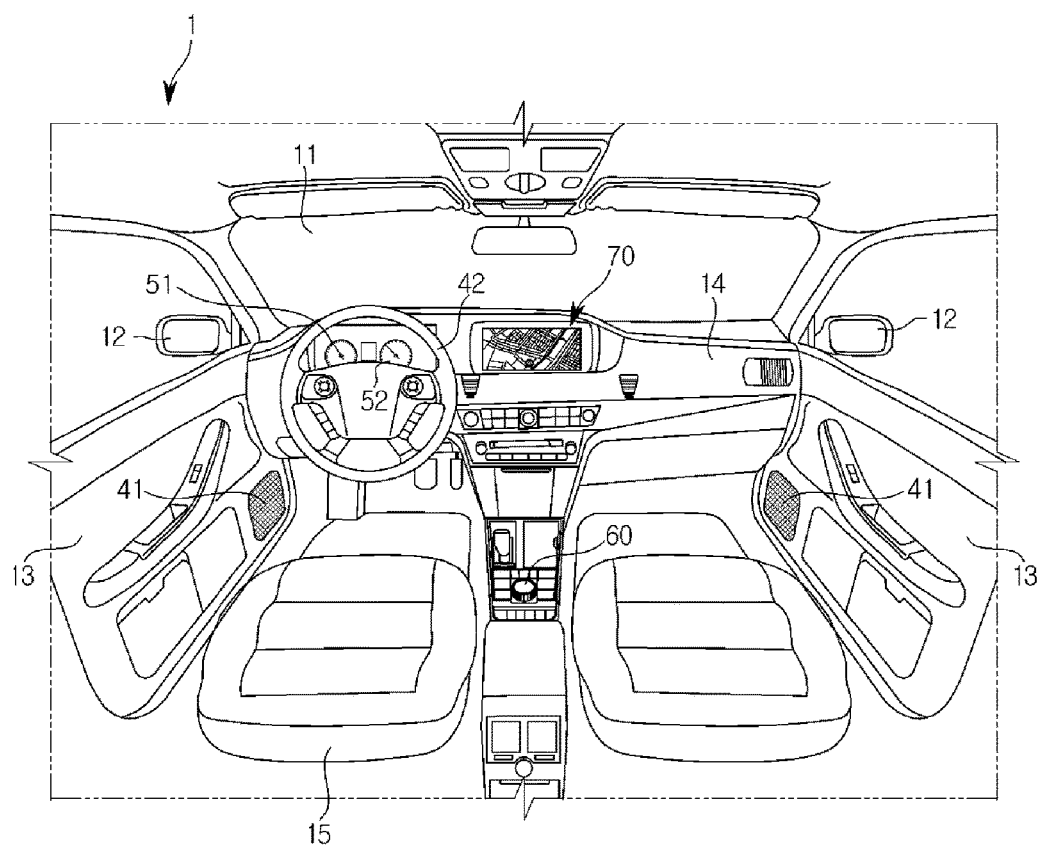
FIG. 2 shows the interior of a vehicle.

FIG. 2 shows an example interior of a vehicle.

As shown in FIG. 2, an interior of the vehicle 1 may include a dashboard 14 on which various systems are installed for the driver to manipulate the vehicle 1, a driver seat 15 seated by the driver, cluster indicators 51, 52 for indicating information about operation of the vehicle 1, and a navigation system 70 for providing not only a route guidance function to give directions but also audio and video functions in response to an instruction from the driver.

The dashboard 14 may be formed to protrude toward the driver from the bottom of the winds screen 11, allowing the driver to manipulate the various systems installed on the dashboard 14 while looking forward.

The driver seat 15 is located opposite the dashboard 14, allowing the driver to drive the vehicle 1 while keeping his/her eye on the road ahead of the vehicle 1 and various systems on the dashboard in a comfortable position.

The cluster indicators 51, 52 may be installed on the dashboard 14 to face the driver seat 15, and may include a speed gage 51 for indicating the current speed of the vehicle 1 and an rpm gage 52 for indicating revolutions per minute of the power system.

The navigation system 70 may include a display for displaying information about a road the vehicle 1 is traveling or a route to a destination intended by the driver, and a speaker 41 for producing sound at the control command of the driver. Recently, it is a trend to install an audio video and navigation (AVN) system in which audio and video players and a navigation system are incorporated on the vehicle.

The navigation system 70 may be installed on the center fascia. The center fascia refers to a control panel portion located on the dashboard 14 between the driver and passenger seats, where the dashboard 14 and a shift lever joins in the vertical direction, having the navigation system 70, an air conditioner, a heater controller, a duct, a cigar jack and ash tray, a cup holder, etc., installed therein. The center fascia may also serve to draw a line between the driver seat and the passenger seat along with a center console.

Furthermore, there may be an extra jog dial 60 for manipulating operation of various systems, including the navigation system 70.

In embodiments of the present disclosure, the jog dial 60 may not only manipulate the operation by being turned or pressed, but may also have a touch recognizable touch pad to recognize handwriting of the user's finger or extra touch-recognizable tool for operation manipulation.

Figure 3:
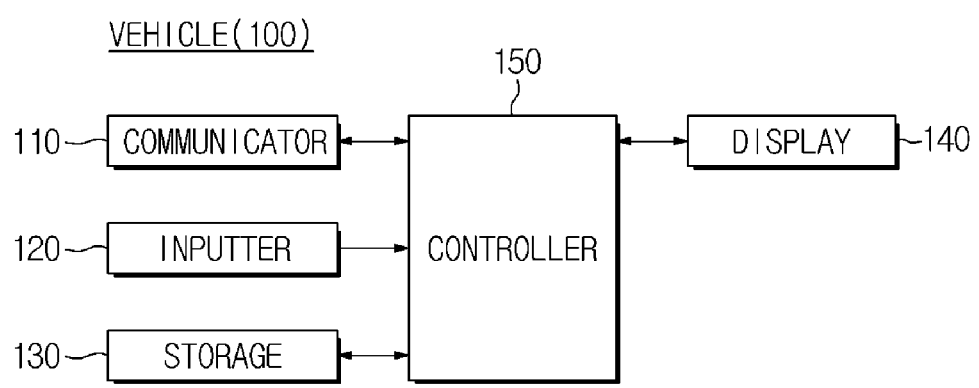
FIG. 3 is a detailed control block diagram of a vehicle.

It should be understood that the interior of the vehicle 1 illustrated in FIG. 2 and described above is provided demonstration purposes only, and thus does not limit the scope of the present disclosure or claims FIG. 3 is a detailed control block diagram of a vehicle.

Figure 4:
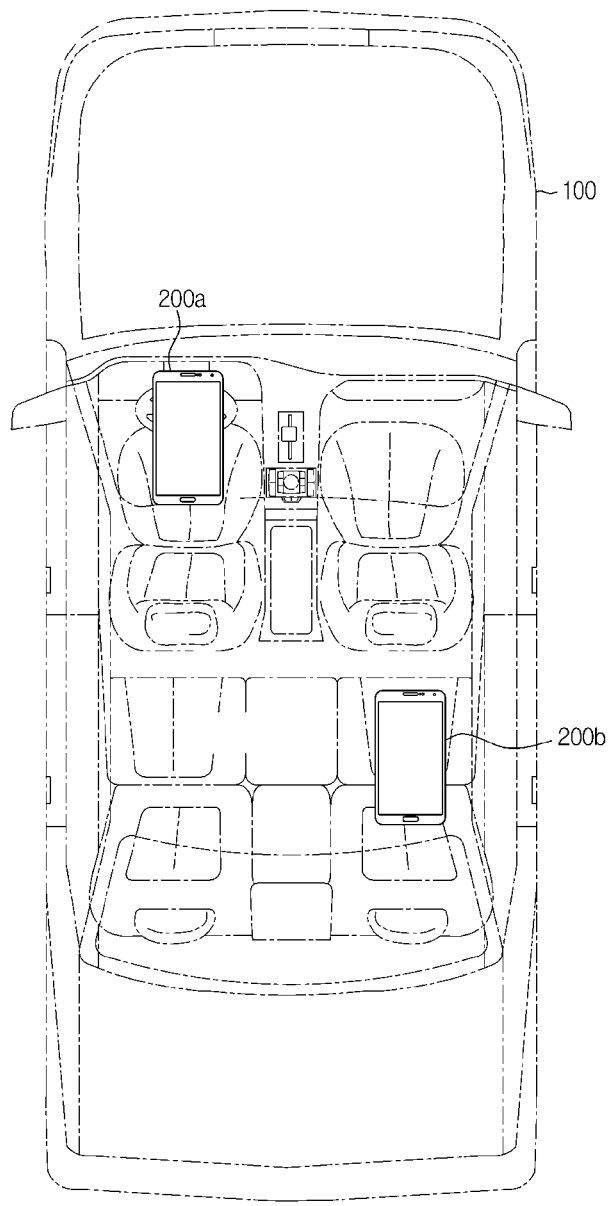
FIG. 4 shows a plurality of mobile communication terminals present in a vehicle.

A vehicle in accordance with embodiments of the present disclosure will be described in connection with FIG. 4 illustrating a case where there are a plurality of mobile communication terminals in a vehicle and FIGS. 5 to 9 illustrating exemplary screens on a display for explaining a method for setting up multi-remote control.

As shown in FIG. 3, the vehicle 100 may include a communicator 110, an inputter 120, a storage 130, a display 140, and a controller 150.

To be more specific, the communicator 110 may be configured to perform wireless communication with a mobile communication terminal (e.g., 200 in FIG. 4) in the vehicle. The communicator 110 may include one or more components that enable communication with an external device, for example, at least one of a short-range communication module, wired communication module, and wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, but also one of various cable communication modules, such as a universal serial bus (USB), a high definition multimedia interface (HDMI), a digital visual interface (DVI), recommended standard (RS) 232, a power cable, or a plain old telephone service (POTS). The wireless communication module may include a wireless communication module for supporting various wireless communication schemes, such as a radio data system-traffic message channel (RDS-TMC), a digital multimedia broadcasting (DMB) module, a wireless fidelity (WiFi) module, and a wireless broadband (Wibro) module, and plus, a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc. The wireless communication module may also include an wireless communication interface with an antenna and receiver for receiving traffic information signals. Furthermore, the wireless communication module may include a traffic information signal conversion module for demodulating a received analog radio signal into a digital control signal through the wireless communication interface.

The inputter 120 may be configured to assist the user to input various information to activate a multi-remote control function to be displayed on the display 140. The inputter 120 may include many different buttons or switches, a pedal, a keyboard, a mouse, a track ball, various levers, a handle, a stick, or some hardware devices for the user input. The inputter 120 may also include a Graphical User Interface (GUI), i.e., a software device, such as a touch pad for the user input. The touch pad may be implemented with a touch screen panel (TSP), thus forming an interlayer structure with the display 140.

The storage 130 may be configured to store information relating to setting up the multi-remote control function and information about the vehicle. For example, the storage 130 may store display information for setting up the multi-remote control function, a reference for distributing the multi-remote control function, etc. The storage 130 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 130 may be a memory implemented with a chip separate from the aforementioned processor in relation to the controller 150, or may be implemented integrally with the processor in a single chip.

The display 140 may display various information relating to setting up multi-remote control in the devices in the vehicle and various information about the vehicle 100. The display 140 may include a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc., but is not limited thereto.

The controller 150 may control the display 140 to display a plurality of remote control functions upon reception of a multi-remote control request from the user, and may distribute the plurality of remote control functions to a plurality of mobile communication terminals 200 of FIG. 4 in the vehicle. In this case, the vehicle 100 and the mobile communication terminals 200 of FIG. 4 may be connected to each other through Bluetooth communication. The mobile communication terminal 200 may activate a function to control a controllable device through the Bluetooth communication connection in the vehicle 100.

The plurality of remote control functions may include a hands-free calling function and a function to remotely control devices in the vehicle. The hands-free calling function supports making calls through Bluetooth communication connection without manipulation of the mobile communication terminal 200, and the function to remotely control devices in the vehicle may be defined to remotely control not only audio streaming but also radio, media (e.g., CD/USB, AUX, music/video player, My Music, Bluetooth), sound, etc. It is not limited thereto, but may also control all other operations of units connected to a head unit over the CAN.

For example, as shown in FIG. 4, there may be a plurality of mobile communication terminals 200a, 200b in the vehicle 100, which may have different control purposes depending on their respective positions in the vehicle. For example, the mobile communication terminal 200a located in the front seat may prefer the hands-free calling function, while the mobile communication terminal 200b located in the back seat may prefer the function to remotely control devices in the vehicle.

Specifically, for initial distribution of the plurality of remote control functions to the plurality of mobile communication terminals 200, the controller 150 may repeatedly perform distribution of the remote control functions at the user request before the number of the mobile communication terminals 200 to which the remote control functions are to be distributed exceeds a multi-remote control reference number. The multi-remote control reference number refers to the number of mobile communication terminals 200 that the remote control functions may be distributed to. For example, if there are two of the remote control functions: a hands-free calling function and a function to remotely control devices in the vehicle, the multi-remote control reference number is two.

Figure 5:
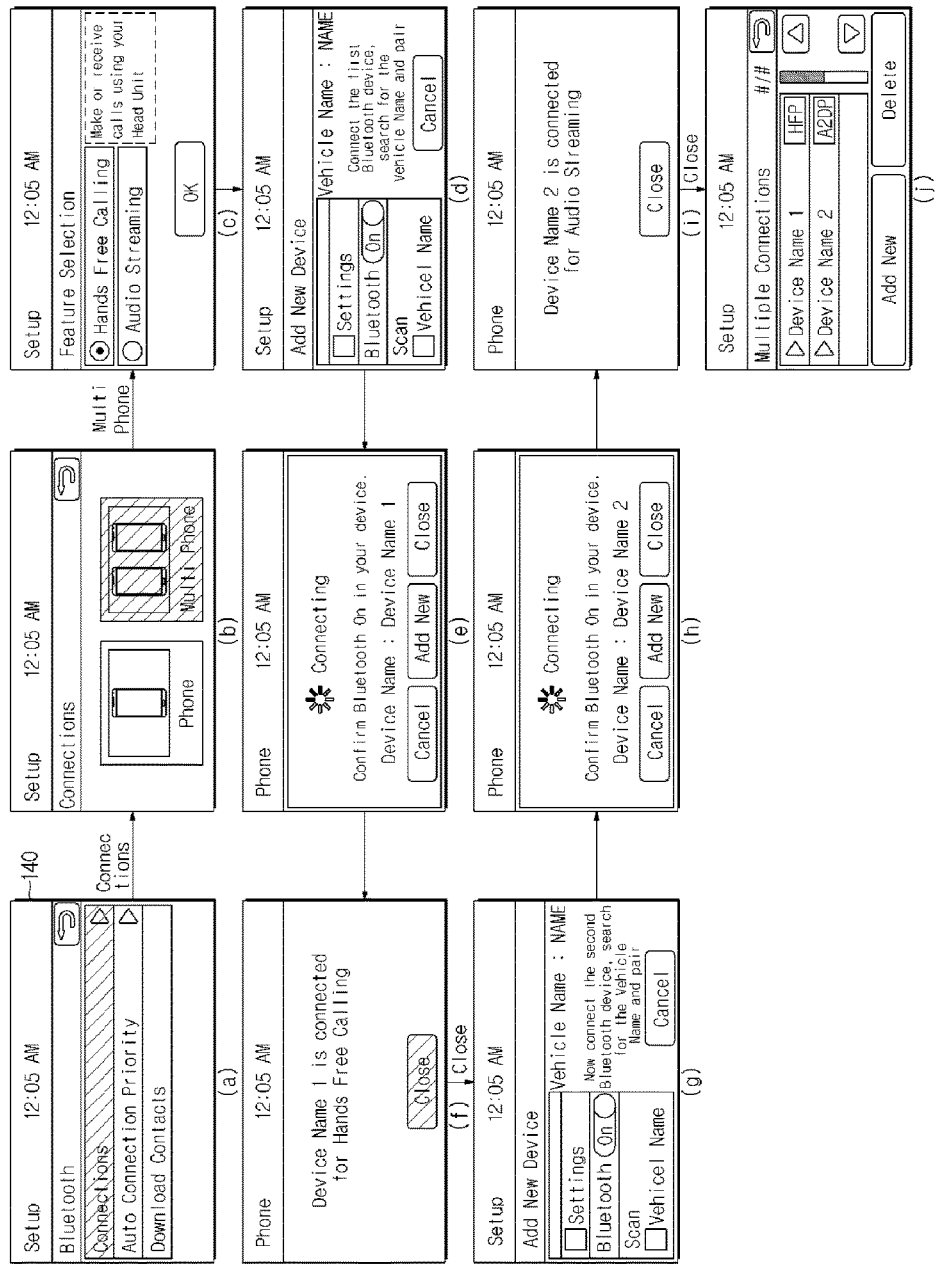
FIGS. 5 to 9 show exemplary screens on a display for explaining a method for setting up multi-remote control.

Referring to FIG. 5, in the case of initially setting up remote control functions, the controller 150 may display a page to activate the remote control functions ((a), (b)) through the display 140, display a plurality of remote control functions (c) when a request for multi-remote control is selected, for the user to select a desired remote control function (e.g., hands-free calling in (c)), and perform environment setting (d) for communication (e.g., Bluetooth communication) to distribute the selected remote control function to the mobile communication terminal 200 and perform a procedure of distributing the remote control function through the communication connection ((e) and (f)). After this, the controller 150 may distribute another remote control function that has not yet been distributed to the mobile communication terminal 200 in a procedure of (g), (h), (i), and (j) until the number of mobile communication terminals 200 the remote control functions are to be distributed exceeds the multi-remote control reference number. For example, the controller 150 may distribute a function to remotely control a device (e.g., audio streaming control function) not yet distributed, to another mobile communication terminal, Device Name 2.

In distributing remote control functions, if a plurality of remote control functions have all been distributed to a single mobile communication terminal, the controller 150 may release a remote control function newly requested by the user among the plurality of remote control functions and distribute the released remote control function to a new mobile communication terminal 200.

Figure 6:
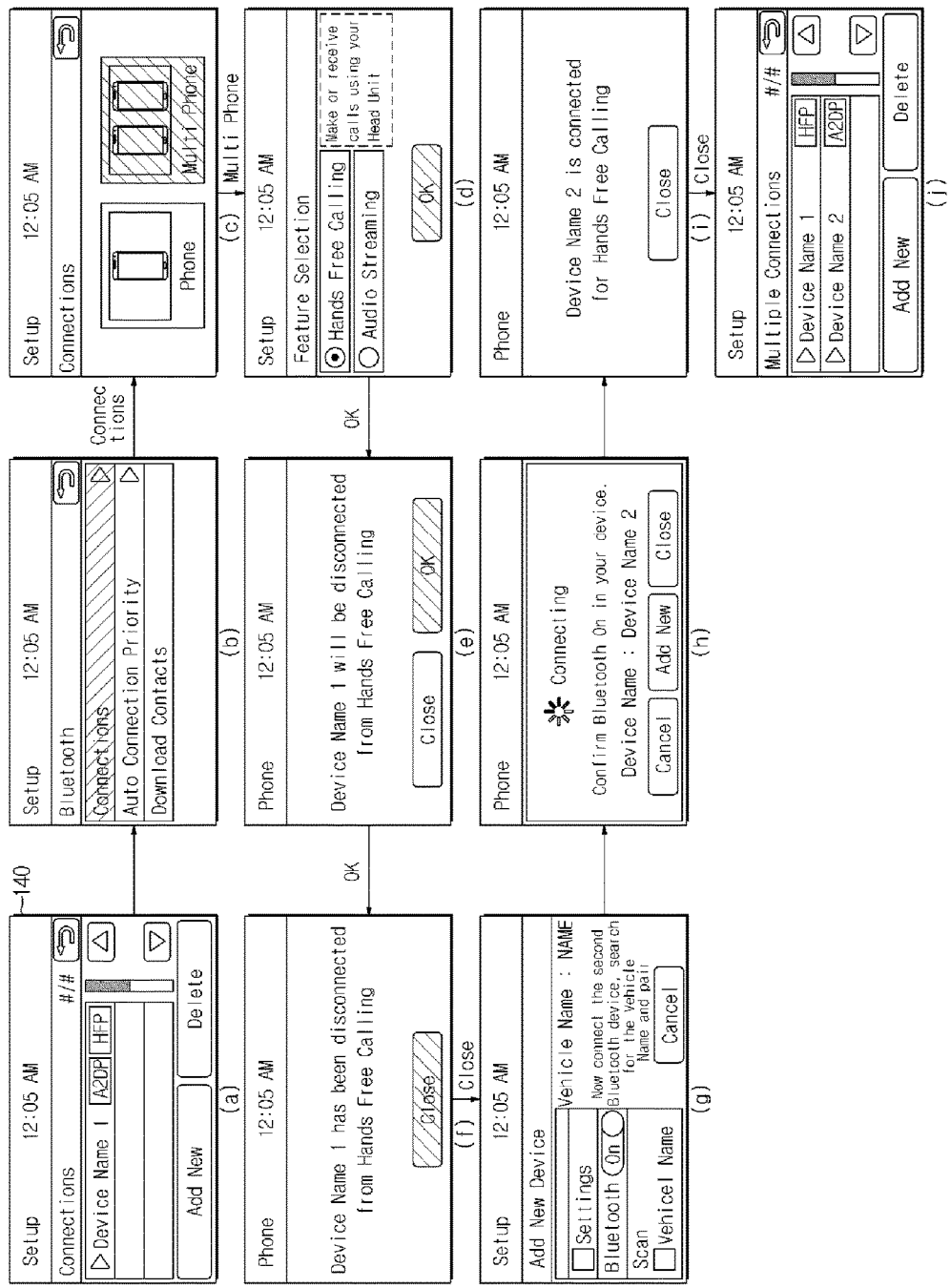

Referring to FIG. 6, in the case that the plurality of remote control functions are all distributed to the single mobile communication terminal 200 (all HFP and A2DP are distributed to Device Name 1 in (a)), the controller 150 may display pages for setting up remote control functions through the display 140 ((b) and (c)), and once a multi-remote control request is selected, display the plurality of remote control functions (d) for the user to select a desired remote control function (e.g., hands-free calling function in (d)). The HFP may refer to the hands-free calling, and A2DP may refer to a function to remotely control a device (e.g., audio streaming).

After this, if the HFP function is selected by the user, the controller 150 may release the HFP function among the remote control functions of the mobile communication terminal 200, Device Name 1 ((e) and (f)) and distribute the released HFP function to a new mobile communication terminal 200, Device Name 2 ((g), (h), (i), and (j)).

Figure 7:
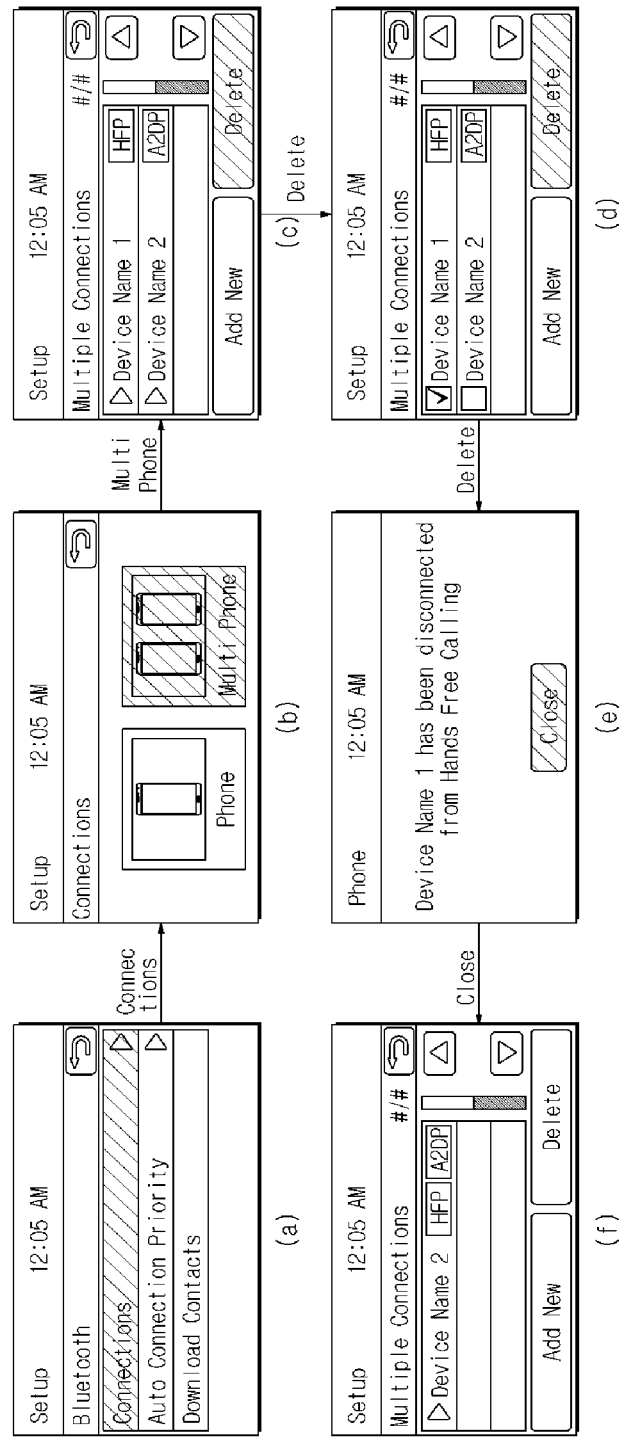

Referring to FIG. 7, the controller 150 may delete one of the plurality of mobile communication terminals 200 with remote control functions activated therein (e.g., Device Name 1 of FIG. 7), at the request of the user. The controller 150 may then distribute the remote control function of the deleted mobile communication terminal 200 (e.g., HFP function) to another mobile communication terminal 200 (e.g., Device Name 2). The other mobile communication terminal 200 may also be a remotely controllable device with a remote control function distributed thereto.

In distributing remote control functions, if the number of mobile communication terminals 200 with remote control function activated therein exceeds the multi-remote control reference number, a mobile communication terminal 200 with a remote control function newly requested by the user already activated therein may be released first, and then the released remote control function may be distributed to a new mobile communication terminal 200.

Figure 8:
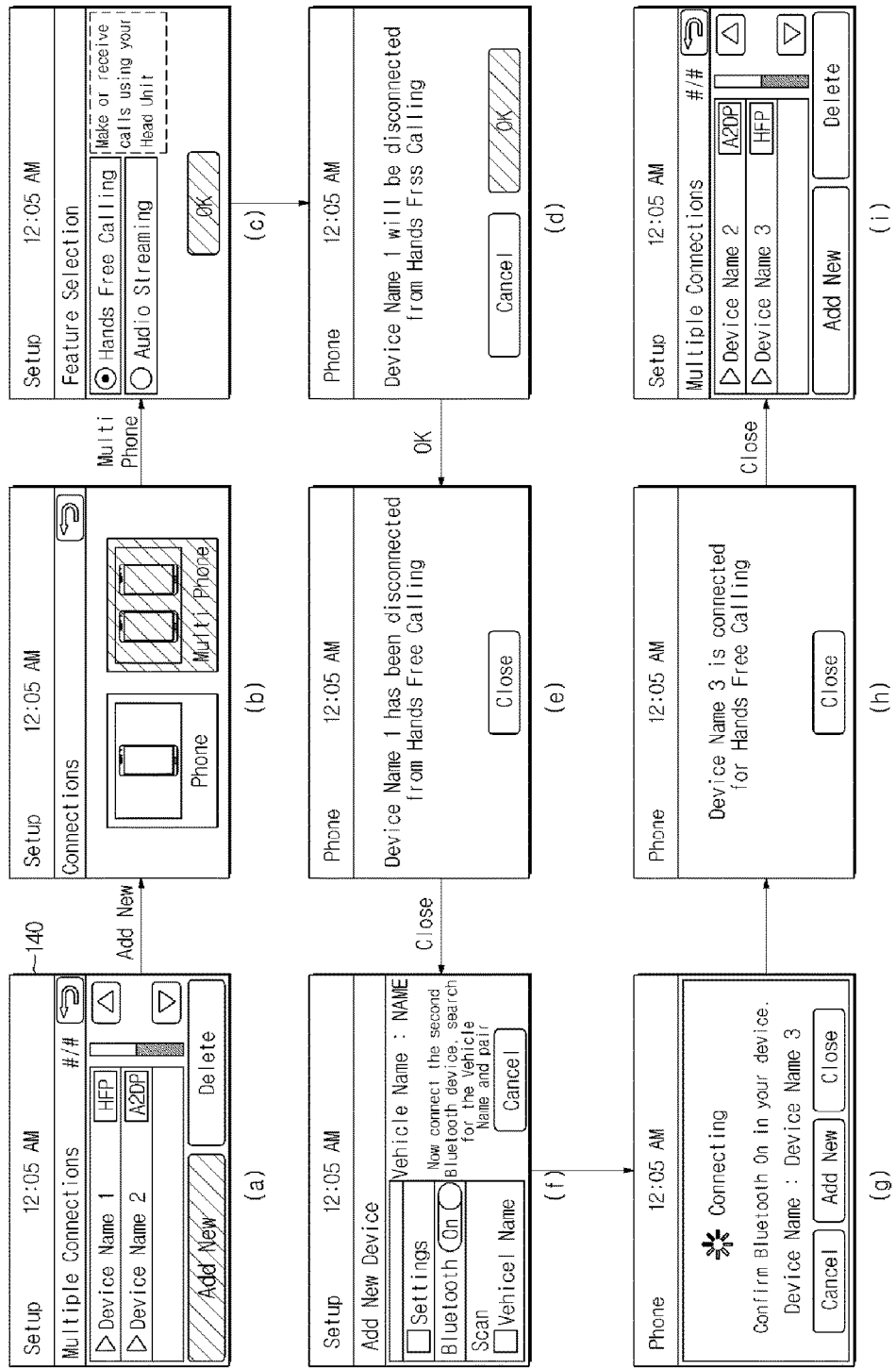

Referring to FIG. 8, in the case that the number of mobile communication terminals 200 with remote control functions activated therein is the same as the multi-remote control reference number and exceeds the multi-remote control reference number in distributing a new remote control function (HFP is distributed to Device Name 1, and A2DP is distributed to Device Name 2 in (a)), the controller 150 may display a page for setting up remote control functions through the display 140 (b) and display a plurality of remote control functions when the multi-remote control request is selected (c) for the user to select a desired remote control function (e.g., hands-free calling function in (c)).

After this, if the HFP function is selected by the user, the controller 150 may release the remote control function of the mobile communication terminal, Device Name 1 to which the HFP has already been distributed ((d) and (e)), and distribute the released HFP function to a newly discovered mobile communication terminal, Device Name 3 ((f), (g), (h), (i), and (j)).

Figure 9:
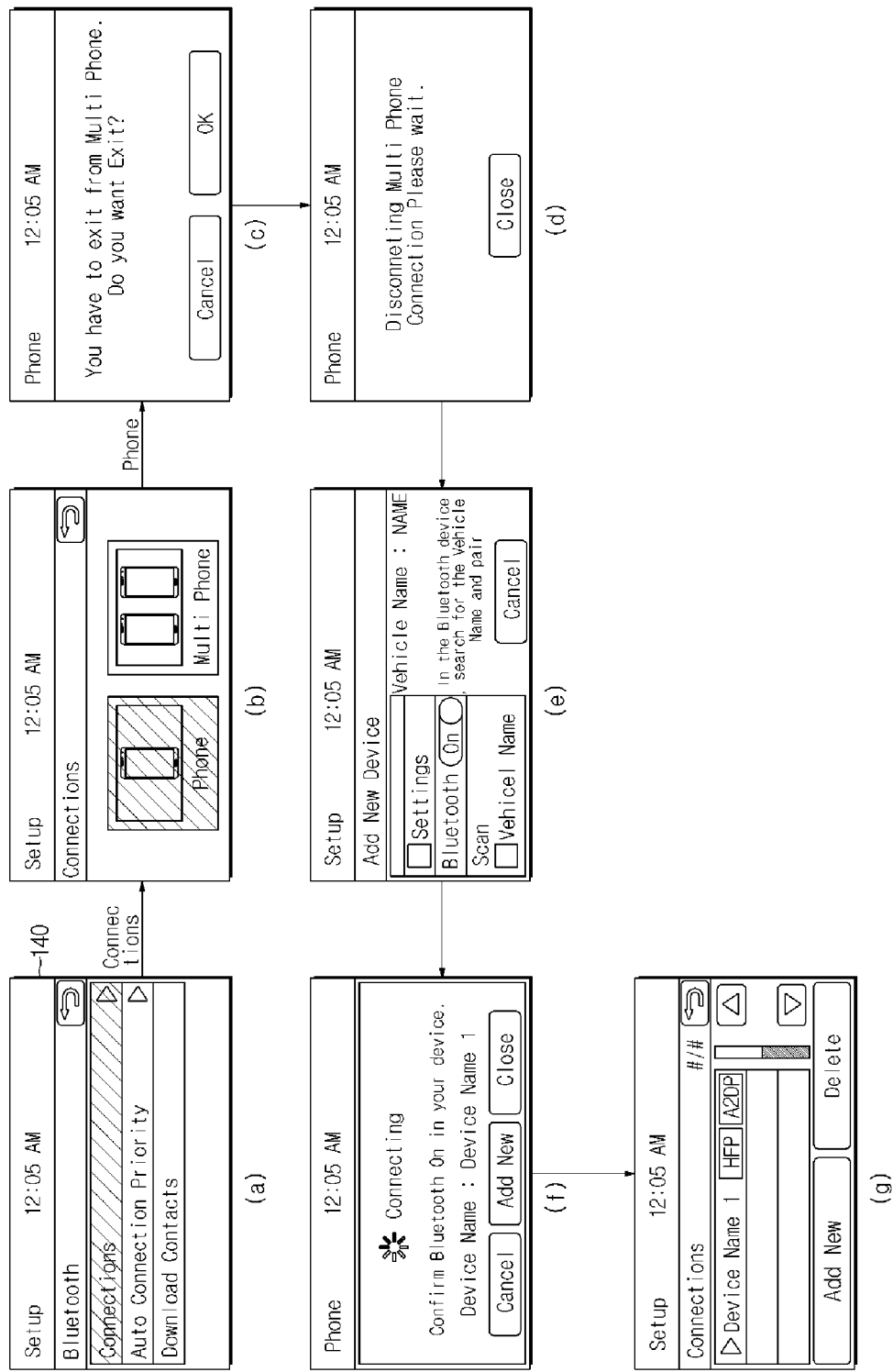

Referring to FIG. 9, the controller 150 may change a multi-remote control mode to a single remote control mode at a request of the user, to release all the remote control functions distributed to the plurality of mobile communication terminals 200. The controller 150 may then distribute all the remote control functions to a new mobile communication terminal, at the request of the user.

Furthermore, if the remote control function is released from one of a plurality of mobile communication terminals 200 at a request of the user, the controller 150 may distribute the released remote control function to another mobile communication terminal 200.

The controller 150 may be implemented with a memory (not shown) storing an algorithm to control operation of the components of the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

Figure 10:
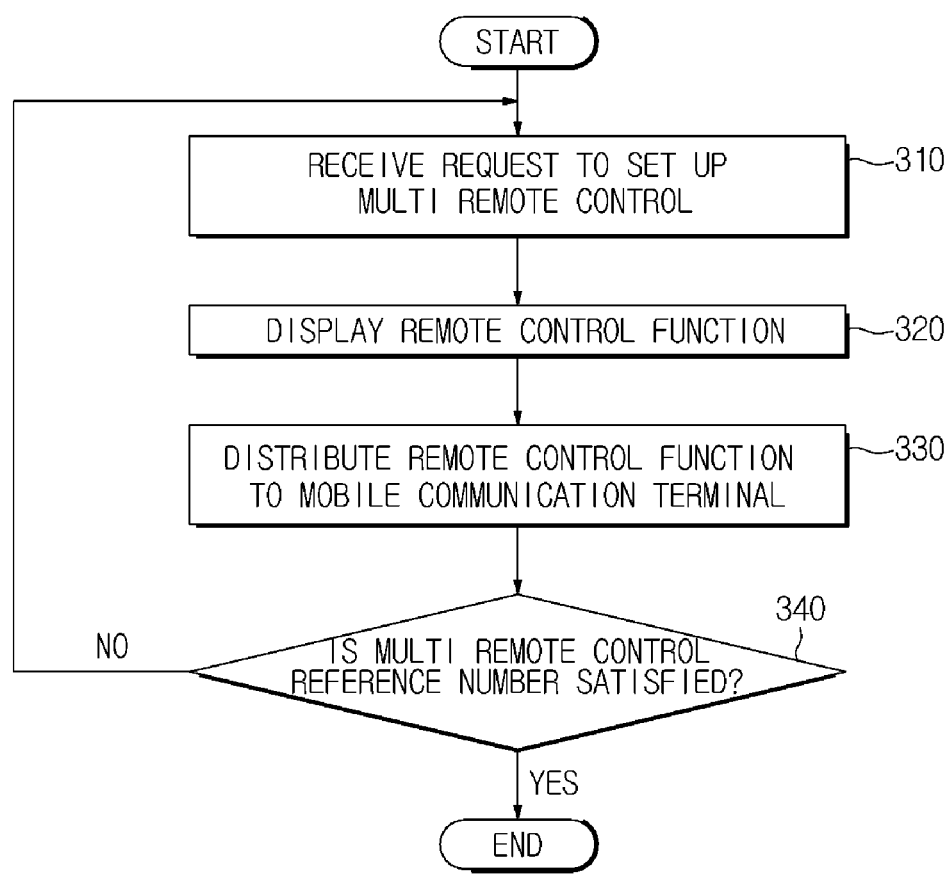
FIG. 10 is a flowchart illustrating a method for activating multi-remote control according to embodiments of the present disclosure.

FIG. 10 is a flowchart illustrating a method for setting up multi-remote control according to embodiments of the present disclosure. The method will be described by taking an example of initial distribution of a plurality of remote control functions to a plurality of mobile communication terminals in a vehicle.

First, the vehicle 100 displays a plurality of remote control functions through the display 140 upon reception of a user request to activate multi-remote control, in 310, 320.

The plurality of remote control functions may include a hands-free calling function and a function to remotely control devices in the vehicle. Furthermore, the vehicle 100 and the mobile communication terminals 200 may be connected to each other through Bluetooth communication.

The vehicle 100 receives a remote control function selected by the user from among a plurality of remote control functions, discovers a mobile communication terminal 200 for communication in the vehicle, and distributes the remote control function to the discovered mobile communication terminal 200, in 330.

Next, the vehicle 100 may repeatedly perform setting up remote control functions at the request of the user, until the number of mobile communication terminals 200 to which the remote control functions are distributed is equal to the multi-remote control reference number, in 340 (and go back to operation 310). The multi-remote control reference number refers to the number of mobile communication terminals 200 that the remote control functions may be distributed to. For example, if there are two of the remote control functions: a hands-free calling function and a function to remotely control devices in the vehicle, the multi-remote control reference number is two.

Figure 11:
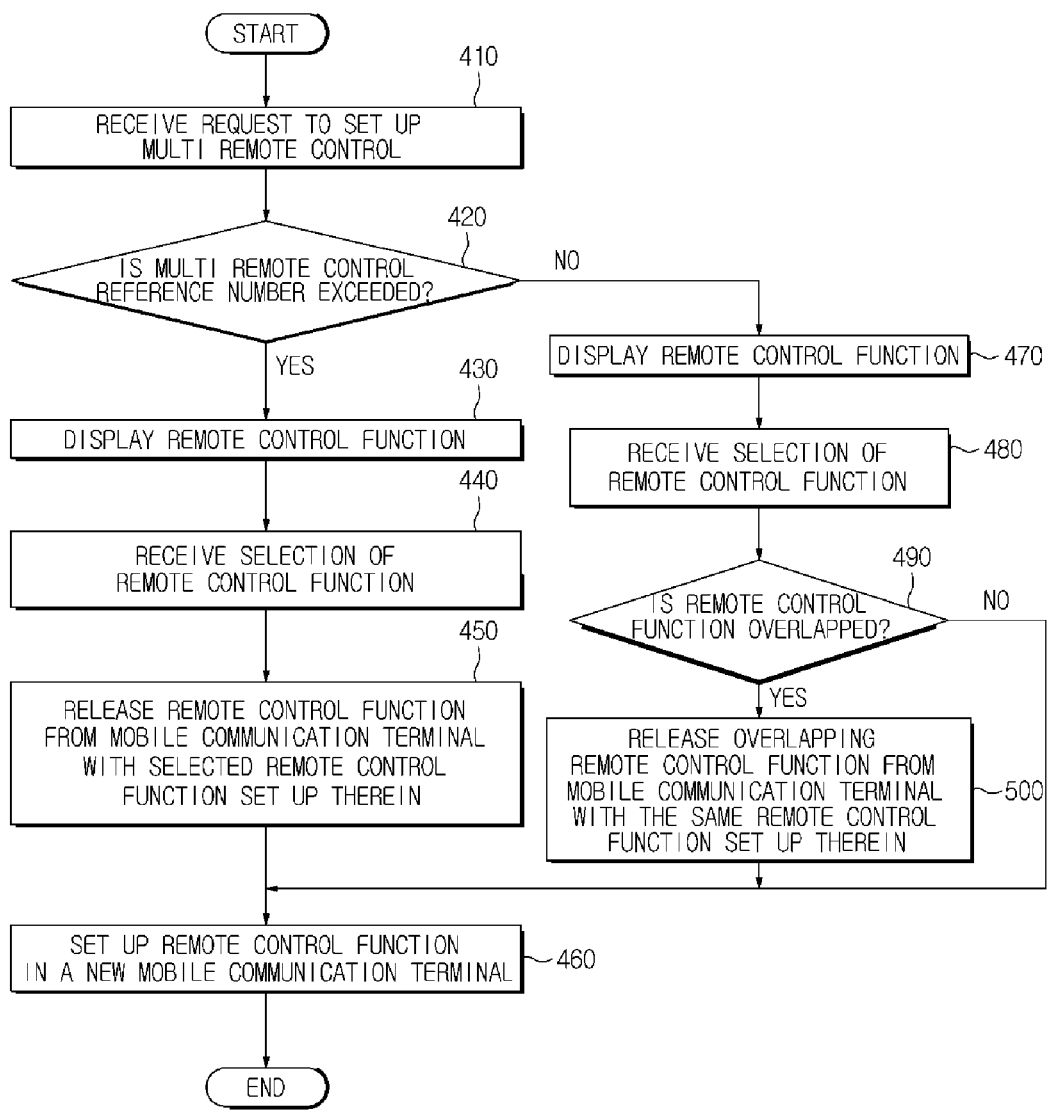
FIG. 11 is a flowchart illustrating an additional method for activating multi-remote control according to embodiments of the present disclosure.

FIG. 11 is a flowchart illustrating an additional method for setting up multi-remote control according to embodiments of the present disclosure. The method will be described by taking an example where there is a mobile communication terminal with a remote control function distributed thereto.

First, the vehicle 100 receives a request to activate multi-remote control from the user, in 410.

Next, it is determined whether there is a mobile communication terminal 200 with a remote control function activated therein, and whether the number of mobile communication terminals 200 with the remote control function activated therein exceeds the multi-remote control reference number, in 420.

If it is determined that the number of mobile communication terminals 200 with the remote control function activated therein exceeds the multi-remote control reference number, the vehicle 100 displays a plurality of remote control functions through the display 140, in 430

The plurality of remote control functions may include a hands-free calling function and a function to remotely control devices in the vehicle (e.g., audio streaming function). Furthermore, the vehicle 100 and the mobile communication terminals 200 may be connected to each other through Bluetooth communication.

The vehicle 100 then receives one of the plurality of remote control functions selected by the user, in 440.

The vehicle 100 then releases the selected remote control function from a mobile communication terminal 200 in which the remote control function has already been activated by the user, in 450. Releasing the remote control function from the mobile communication terminal 200 is to distribute the remote control function to a new mobile communication terminal 200.

The vehicle 100 then discovers a mobile communication terminal 200 in the vehicle, and distributes the remote control function to the discovered mobile communication terminal 200, in 460. The vehicle 100 may distribute the released remote control function to the discovered new mobile communication terminal 200.

Although not shown, after the operation 460, the vehicle 100 changes a multi-remote control mode to a single remote control mode when a request to release the multi-remote control is received from the user, to release all the remote control functions distributed to the plurality of mobile communication terminals 200.

Furthermore, after the operation 460, upon reception of the user request to release the remote control function from one of the plurality of mobile communication terminals 200 with the remote control function distributed thereto, the vehicle 100 may release the remote control function requested to be released from the mobile communication terminal 200 and distribute the released remote control function to another mobile communication terminal 200.

Meanwhile, if it is determined that the number of mobile communication terminals 200 with the remote control function activated therein does not exceed the multi-remote control reference number in 420, the vehicle 100 displays a plurality of remote control functions through the display 140, in 470.

The vehicle 100 then receives one of the plurality of remote control functions selected by the user, in 480.

The vehicle 100 then determines whether a remote control function selected by the user overlaps one that has been previously activated, in 490. In other words, it is determined whether the remote control function selected by the user has already been distributed to another mobile communication terminal 200.

If it is determined that the remote control function selected by the user overlaps one that has been previously activated, the vehicle 100 releases the overlapping remote control function from the corresponding mobile communication terminal 200, in 500.

The vehicle 100 then discovers a mobile communication terminal 200 in the vehicle, and distributes the remote control function to the discovered mobile communication terminal 200, in 460. The vehicle 100 may distribute the released remote control function to the discovered new mobile communication terminal 200.

Meanwhile, if it is determined that the number of mobile communication terminals 200 with the remote control function activated therein does not exceed the multi-remote control reference number in 420, the vehicle 100 displays a plurality of remote control functions through the display 140, in 470.

The vehicle 100 then receives one of the plurality of remote control functions selected by the user, in 480.

The vehicle 100 then determines whether the remote control function selected by the user overlaps one that has been previously activated, in 490.

If it is determined that the remote control function selected by the user does not overlap any of the previously activated remote control functions, the vehicle 100 performs operation 460.

According to embodiments of the present disclosure, a different remote control function may be distributed to each of a plurality of mobile communication terminals in a vehicle, allowing not only the driver but also the fellow passenger to perform controlling a device in the vehicle and thus enjoy comfortable driving. Furthermore, with the distribution of remote control functions to the respective mobile communication terminals, an effect may be expected to prevent the driver from being distracted with control of a device in the vehicle.

The embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media. The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

LISTING OF SYMBOLS

100: VEHICLE
110: COMMUNICATOR
120: INPUTTER
130: STORAGE
140: DISPLAY
150: CONTROLLER

What is claimed is:
1. A vehicle comprising:
a communicator configured to perform wireless communication with a mobile communication terminal disposed in the vehicle;
a display configured to display information relating to multi-remote control; and a controller configured to display a plurality of remote control functions on the display in response to a request for the multi-remote control and to distribute the plurality of remote control functions to a plurality of mobile communication terminals disposed in the vehicle in response to a selection of at least one of the plurality of remote control functions.

2. The vehicle of claim 1,
wherein the controller is further configured to repeatedly perform the distribution of the plurality of remote control functions in response to the request unless a number of the plurality of the mobile communication terminals exceeds a multi-remote control reference number.

3. The vehicle of claim 1,
wherein, when all of the plurality of remote control functions have been distributed to a single mobile communication terminal, the controller is further configured to release a remote control function newly requested by a user among the plurality of remote control functions and to distribute the released remote control function to a new mobile communication terminal.

4. The vehicle of claim 1,
wherein, when a number of the plurality of mobile communication terminals having an activated remote control function exceeds a multi-remote control reference number, the controller is further configured to release a remote control function newly requested by a user from a mobile communication terminal among the plurality of mobile communication terminals having the activated the remote control function and to distribute the released remote control function to a new mobile communication terminal.

5. The vehicle of claim 1,
wherein the controller is further configured to change a multi-remote control mode to a single remote control mode in response to a user request and to release all of the plurality of remote control functions distributed to the plurality of mobile communication terminals.

6. The vehicle of claim 1,
wherein, when a remote control function is to be released from one of the plurality of mobile communication terminals, the controller is further configured to distribute the released remote control function to another mobile communication terminal of the plurality of mobile communication terminals.

7. The vehicle of claim 1,
wherein the plurality of remote control functions includes a hands-free calling function and a function to remotely control devices in the vehicle.

8. The vehicle of claim 1,
wherein the communicator and the given mobile communication terminal are connected to each other through Bluetooth communication.

9. A method for activating multi-remote control in a vehicle, the method comprising:
displaying a plurality of remote control functions through a display in response to a user request to activate multi-remote control;
receiving a selection of a remote control function among the plurality of remote control functions; and
distributing the selected remote control function to at least one of a plurality of mobile communication terminals.

10. The method of claim 9, further comprising
after distributing the remote control function, repeatedly performing distribution of the plurality of remote control functions in response to the request unless a number of the plurality of the mobile communication terminals exceeds a multi-remote control reference number.

11. The method of claim 9, further comprising:
after receiving the request to activate the multi-remote control and before the displaying of the plurality of remote control functions, determining whether there is a mobile communication terminal among the plurality of mobile communication terminals having an activated remote control function; and
when it is determined that there is a mobile communication terminal having an activated remote control function, determining whether a number of the plurality of mobile communication terminals having an activated remote control function exceeds a multi-remote control reference number.

12. The method of claim 11, further comprising:
when the number of the plurality of mobile communication terminals having the activated remote control function exceeds the multi-remote control reference number,
releasing the remote control function selected by a user from the mobile communication terminal having the activated remote control function after receiving the selection of the remote control function and before the distribution of the remote control function to the discovered mobile communication terminal; and
distributing the released remote control function to a newly discovered mobile communication terminal.

13. The method of claim 11, further comprising:
when a number of the plurality of mobile communication terminals having the activated remote control function does not exceed the multi-remote control reference number,
determining whether the remote control function selected by a user overlaps a remote control function that has been previously activated after receiving the selection of the remote control function and before the distribution of the remote control function to the discovered mobile communication terminal;
when it is determined that the remote control function selected by the user overlaps a remote control function that has been previously activated, releasing the overlapping remote control function from a corresponding mobile communication terminal; and
distributing the released remote control function to a newly discovered mobile communication terminal.

14. The method of claim 11, further comprising:
when the number of the plurality of mobile communication terminals having the activated remote control function does not exceed the multi-remote control reference number,
determining whether the remote control function selected by a user overlaps a remote control function that has been previously activated after receiving the selection of the remote control function and before the distribution of the remote control function to the discovered mobile communication terminal; and
when it is determined that the remote control function selected by the user does not overlap a remote control function that has been previously activated,
distributing the remote control function selected by the user to the discovered mobile communication terminal.

15. The method of claim 9, further comprising:
after the distribution of the remote control function to the discovered mobile communication terminal, changing a multi-remote control mode to a single remote control mode in response to a request to release a multi-remote control from a user; and releasing all of the plurality of remote control functions distributed to the plurality of mobile communication terminals.

16. The method of claim 9, further comprising:

after the distribution of the remote control function to the discovered mobile communication terminal, releasing a remote control function requested to be released from the corresponding mobile communication terminal when a request to release the remote control function from a mobile communication terminal of the plurality of mobile communication terminals is received from a user; and distributing the released remote control function to another mobile communication terminal.

17. The method of claim 9, wherein the plurality of remote control functions includes a hands-free calling function and a function to remotely control devices in the vehicle.

18. The method of claim 9, wherein a communicator equipped in the vehicle and the mobile communication terminal are connected to each other through Bluetooth communication.

* * * * *